2,906,626
EDIBLE OIL EMULSIONS

Beverly M. Eagon and George K. Greminger, Jr., Midland, Mich., assignors to The Dow Chemical Company, Midland, Mich., a corporation of Delaware No Drawing. Application July 22, 1957
Serial No. 673,117

7 Claims. (Cl. 99—140)

This invention relates to improved edible oil emulsions. More particularly it relates to such emulsions having improved shelf life and resistance to microbial attack. The invention additionally contemplates an improved process for obtaining such emulsions.

Many of the well-known natural and synthetic flavors are liquids and consist of complex combinations of several compounds. These flavor oils are highly volatile and subject to oxidation from the atmosphere. Because of their great volatility, the oils tend to lose their flavor and odor upon standing. In addition, the oils or extracts are very difficult to incorporate homogeneously or uniformly into solids, such as gelatin. Because of those difficulties, it has been proposed to prepare aqueous emulsions of the flavor oil and to package the emulsions as such or to dry the disperse phase into a granular product. Many materials have been proposed as emulsifying or suspending agents for these applications. Exemplary of those agents are the water-dispersible gums, such as gum arabic and gum tragacanth, or other polysaccharides, and water-soluble cellulose derivatives, such as carboxymethyl hydroxyethyl cellulose or sodium carboxymethyl cellulose. The water-dispersible gums had to be employed in high concentrations to achieve satisfactory emulsion stability. Those concentrations created undesirable taste effects and in addition a preservation problem, since the gums spoil rapidly in the dissolved state. Some of the cellulose derivatives did not provide the desired emulsions. Of those cellulose derivatives that did, the particle size was so large that the resultant emulsions had very poor shelf life. Because of the inherent disadvantages in all prior known flavor oil emulsions, continued search has been made to find improved emulsifying and suspending agents.

Accordingly, it is the principal object of this invention to provide improved edible oil, particularly flavor oil, emulsions having greater shelf life stability than the prior known emulsions.

It is a further object of this invention to provide such emulsions which are resistant to microbial attack.

Another object is the provision of such emulsions containing less suspending agent than has been hitherto employed.

Still another object is the provision of an improved process for preparing such emulsions.

The above and related objects are achieved with a process wherein a hydroxypropyl methyl cellulose is first wetted with the edible oil to be emulsified and the wetted cellulose ether emulsified by the agitated addition thereto of a water-propylene glycol medium. The invention additionally contemplates the emulsions so-formed.

The useful cellulose ethers are the water-soluble hydroxypropyl methyl celluloses and those containing from 28–30 percent methoxyl substitution and from 7 to 12 percent of hydroxypropyl substitution are preferred. These ethers are water-soluble and result in stable emulsions of small particle size. Such ethers are available commercially. Although hydroxypropyl methyl cellulose ethers which are water-soluble but fall outside of the above stated range of substitution will form emulsions, the particle sizes of those emulsions is larger with some decrease in shelf life stability.

Any viscosity grade of the cellulose ether as defined above may be employed in preparing the emulsions. By viscosity grade is meant the viscosity of a 2 percent aqueous solution measured at 20° C. and expressed in centipoises. The higher viscosity grades are more difficultly soluble than the lower viscosity grades, but that is at least partially compensated by the fact that less of the high viscosity ether is usually required to give a particular emulsion stability. Thus, the choice of viscosity grade is chiefly one of individual preference, the equipment available to prepare the emulsions, and other practical considerations.

The addition of propylene glycol into the composition greatly increases the stability of the emulsions. Although the exact reason for this effect is not known, it is believed that the propylene glycol increases the mutual solubility of the oil and cellulose ether.

The ingredients may be employed in a wide range of proportions. It has been found that stable emulsions containing up to 30 percent or higher of the edible oil may be prepared. There will be little use in preparing an emulsion containing less than 1 percent by weight of the oil. It is preferred that the emulsions contain from 5 to 25 percent by weight of oil since these are more easily prepared and are more useful and stable than those which are either more dilute or concentrated.

The cellulose ether should be employed in a concentration of at least one percent by weight and preferably of from 2 to 5 percent by weight. The optimum concentration required will vary with the particular oil being emulsified and with the viscosity grade of the cellulose ether being employed. A trained investigator will be able to determine easily the optimum concentration with but simple preliminary experiments. With the prior used water-dispersible gums, it was necessary to use up to 20 percent of the gum to achieve a stable emulsion.

The propylene glycol should be used in a concentration of from 5 to 30 percent by weight and preferably from 5 to 20 percent by weight. Little added stability is imparted to an emulsion containing appreciably less than 5 percent and no additional benefits are conferred on the emulsion from the use of more than 30 percent.

Within the preferred ranges of composition, the resulting emulsions are extremely stable to unagitated storage and may be kept for several months without any evidence of phase separation.

The emulsions are prepared by the improved process wherein the cellulose ether is dispersed in or at least wetted by the oil and the dispersed or wetted ether emulsified by the agitated addition thereto of the aqueous phase containing the propylene glycol. It has been found that the improved process is less time consuming than the prior technique of emulsifying the oil in an aqueous solution of the cellulose ether. In addition, the stability of the emulsions prepared by the improved process is markedly improved over similar emulsions prepared by the prior processes even when the improved compositions of this invention are employed. In the process there is apparently a phase inversion so that the desired oil-in-water emulsions are obtained.

The emulsions prepared in accordance with this invention may be used as such. In these emulsions, the edible oils retain their taste and odor for prolonged periods, are resistant to oxidation and microbial attack, and are convenient to use.

The advantages of the process and of the emulsions thereby prepared will be more apparent from the following illustrative examples wherein all parts and percentages are by weight.

EXAMPLE 1

A comparison of the process of this invention with a conventional process for preparing edible oil emulsions was made using only the cellulose ether and varying amounts of lemon oil. In the old process a 2 percent aqueous solution of the cellulose ether was prepared and the lemon oil dispersed therein. In the process of this invention, the lemon oil and cellulose ether were dispersed and water added to the resultant mixture while agitated. In all cases the cellulose ether employed was a hydroxypropyl methyl cellulose having substitution within the range of from 28 to 30 percent methoxyl and from 7 to 12 percent hydroxypropoxyl and of a viscosity grade of 4000 centipoises. The particle size was measured visually with a microscope having a calibrated eyepiece. The shelf life stability was determined by daily visual examination of the emulsions for evidence of phase separation. The results are tabulated in Table I.

*Table I*

| Percent lemon oil | Particle size (microns) | Shelf life |
|---|---|---|
| Conventional process (for comparison): | | |
| 5 | 83-160 | Sl. separation 1 day. |
| 15 | 50-83 | Do. |
| 25 | 33-83 | Do. |
| Process of this invention: | | |
| 5 | <16.6 | Sl. separation 1 week. |
| 15 | <16.6 | Do. |
| 25 | <16.6 | Do. |

Even without the inclusion of the propylene glycol, the new process reduces the particle size substantially and significantly extends the shelf life stability.

EXAMPLE 2

The effect of the inclusion of propylene glycol was shown by preparing several compositions using lemon oil, the cellulose ether used in Example 1, and the glycol in varying proportions. All of the compositions were prepared in accordance with the process of this invention. The particle size was determined microscopically and was found to be less than 16.6 microns in all cases. The shelf life was determined by visual examination for phase separation. The results are listed in Table II.

*Table II*

| Percent cellulose ether | Percent lemon oil | Percent propylene glycol | Shelf life |
|---|---|---|---|
| 1 | 6 | | Slight separation 3 days. |
| 1 | 6 | 5 | Separated 2 weeks. |
| 2 | 6 | | Slight separation 5 days. |
| 2 | 6 | 10 | No separation after 3 months. |
| 2 | 15 | | Slight separation 5 days. |
| 2 | 15 | 10 | No separation after 3 months. |
| 2 | 25 | | Slight separation 1 week. |
| 2 | 25 | 10 | No separation after 3 months. |
| 2 | 30 | 10 | Do. |

The results show that although the inclusion of propylene glycol per se has no significant effect on the particle size, its inclusion does appreciably extend the shelf life of the emulsions.

EXAMPLE 3

The cellulose ether used in the emulsions of this invention was compared with several other synthetic and natural materials. The emulsions were all prepared by emulsifying 15 percent of lemon oil in accordance with the process of this invention and the shelf life determined by visual examination for phase separation. The results are found in Table III.

*Table III*

| Emulsifier for comparison | Percent emulsifier | Shelf life |
|---|---|---|
| Gum arabic | 10 | Separated 1 day. |
| Do | 15 | Do. |
| Do | 20 | No separation after 3 months. |
| Carboxymethyl cellulose | 2 | Separated immediately. |
| Dextran | 2 | Do. |
| Polyvinylpyrrolidone | 2 | No emulsion obtained. |
| Ether of this invention/hydroxypropyl methyl cellulose. | 2 | No separation after 3 months. |

The results indicate that gum arabic, which is a commercially used material, must be employed in 10 times greater concentration than the cellulose ether of this invention to achieve about the same shelf life.

EXAMPLE 4

The utility of the cellulose ethers of this invention in preparing edible oil emulsions independent of viscosity grade was determined by comparing the 15 and 4000 centipoise grades at 2 percent concentration in emulsifying 15 percent lemon oil using 10 percent propylene glycol. The particle size and shelf life were determined as before. The results are shown in Table IV.

*Table IV*

| Viscosity grade | Particle size (microns) | Shelf life |
|---|---|---|
| 15 centipoises | >16.6 | No separation after 3 months. |
| 4,000 centipoises | >16.6 | Do. |

Thus, the effect is not one of a thickened or viscous aqueous phase, as may be the case with the natural gums, but is an emulsion.

EXAMPLE 5

Several compositions were prepared by slurrying 2 percent of the cellulose ether described in Example 1 in 30 percent of an edible oil. Added to that slurry while agitated was an aqueous phase containing 10 percent propylene glycol. The oils used were peanut, corn, cottonseed, and olive oils. In each case the particle size was less than 17 microns as measured microscopically. The emulsions were allowed to stand without agitation and after 3 months there was no evidence of phase separation.

The compositions were again prepared in like manner using 5 percent of each of the oils and the same results were noted.

We claim:
1. A process for preparing stable oil-in-water emulsions consisting of sequentially dispersing and wetting of at least 1 percent based on the total weight of emulsion of a water-soluble hydroxypropyl methyl cellulose ether with from 1 to 30 percent based on the total weight of emulsion of an edible oil, and thereafter stirring an aqueous phase containing from 5 to 30 percent based on the total weight of emulsion of propylene glycol into the so-dispersed cellulose ether-edible oil mixture until emulsification occurs.

2. The process claimed in claim 1 wherein said cellulose ether is one containing from 28 to 30 percent methoxyl substitution and from 7 to 12 percent hydroxypropoxyl substitution.

3. The process claimed in claim 1 wherein said edible oil is a flavor oil.

4. An edible oil-in-water emulsion consisting essentially of from 1 to 30 percent of the weight of said emulsion of an edible oil, at least 1 percent of the weight of said emulsion of a water-soluble hydroxypropyl methyl cellulose ether as an emulsifier, from 5 to 30 percent of the weight of said emulsion of propylene glycol, and the remainder made up of water.

5. The edible oil-in-water emulsion claimed in claim 4 wherein said edible oil is a flavor oil.

6. The edible oil-in-water emulsion claimed in claim 4 wherein said cellulose ether contains from 28 to 30 percent methoxyl substitution and from 7 to 12 percent hydroxypropoxyl substitution.

7. The edible oil-in-water emulsion claimed in claim 4 wherein the average particle size is less than 17 microns in diameter.

References Cited in the file of this patent

UNITED STATES PATENTS

| | | |
|---|---|---|
| 2,021,027 | Snell et al. | Nov. 12, 1935 |
| 2,217,309 | Epstein et al. | Oct. 8, 1940 |
| 2,377,610 | Brown | June 5, 1945 |
| 2,785,982 | Weaver | Mar. 19, 1957 |

OTHER REFERENCES

"Water-Soluble Cellulose Ethers as Emulsifying Agents," by Morrison et al., J.S.C.I., 68, December 1949, pages 333–336.